United States Patent
Yang et al.

(10) Patent No.: US 9,766,421 B2
(45) Date of Patent: Sep. 19, 2017

(54) METHOD FOR COMPENSATING FOR WAVELENGTH SHIFT IN WAVELENGTH SELECTIVE SWITCH, AND DEVICE THEREFOR

(75) Inventors: Liu Yang, Wuhan (CN); Meng Wang, Wuhan (CN); Zhilin Yuan, Wuhan (CN); Rui Yang, Wuhan (CN); Lidan Song, Wuhan (CN); Liping Sun, Wuhan (CN); Jinping Guo, Wuhan (CN); Dingkang Chen, Wuhan (CN); Yuhong Ma, Wuhan (CN); Lihong Tang, Wuhan (CN)

(73) Assignee: Accelink Technologies Co., Ltd. (CN)

( * ) Notice: Subject to any disclaimer, the term of this patent is extended or adjusted under 35 U.S.C. 154(b) by 596 days.

(21) Appl. No.: 14/364,183

(22) PCT Filed: Sep. 4, 2012

(86) PCT No.: PCT/CN2012/080943
§ 371 (c)(1),
(2), (4) Date: Sep. 4, 2014

(87) PCT Pub. No.: WO2013/091401
PCT Pub. Date: Jun. 27, 2013

(65) Prior Publication Data
US 2015/0043055 A1 Feb. 12, 2015

(30) Foreign Application Priority Data
Dec. 20, 2011 (CN) .......................... 2011 1 0428394

(51) Int. Cl.
*G02B 7/182* (2006.01)
*G02B 7/00* (2006.01)
(Continued)

(52) U.S. Cl.
CPC .............. *G02B 7/008* (2013.01); *B32B 41/00* (2013.01); *G02B 7/181* (2013.01);
(Continued)

(58) Field of Classification Search
None
See application file for complete search history.

(56) References Cited

U.S. PATENT DOCUMENTS

| 6,381,387 B1 * | 4/2002 | Wendland, Jr. ........... | G01J 3/02 385/15 |
| 7,016,594 B1 * | 3/2006 | Godil ................... | G02B 6/4226 385/147 |

(Continued)

FOREIGN PATENT DOCUMENTS

| CN | 2550738 | 5/2003 |
| CN | 102608712 | 7/2012 |

(Continued)

OTHER PUBLICATIONS

International Search Report for Application No. PCT/CN2012/080943 dated Dec. 6, 2012.

*Primary Examiner* — Mike Stahl
(74) *Attorney, Agent, or Firm* — Lerner, David, Littenberg, Krumholz & Mentlik, LLP

(57) ABSTRACT

A method for compensating for a wavelength shift in a wavelength selective switch (WSS), and a device therefor. The device comprises a fixed seat (301) as well as a rotation beam (304) and a compensation block (302) that have different thermal expansion amounts, the rotation beam (304) and the compensation block (302) being fixedly adhered to the fixed seat (301). In the method, a combined structure of the rotation beam (304) and the compensation block (302) with different thermal expansion amounts is adopted; the combined structure rotates by means of different expansion amounts generated by the rotation beam (304)

(Continued)

and the compensation block (302) at the same external temperature, and further drives an optical element of the WSS to rotate, hence compensating for a wavelength shift of the WSS. The method is safe and reliable; the device has a simple structure, and is convenient to encapsulate, is applicable to various WSS optical paths, and does not affect advantages of the optical path structure of the WSS.

11 Claims, 4 Drawing Sheets

(51) Int. Cl.
*G02B 7/18* (2006.01)
*G02B 26/08* (2006.01)
*B32B 41/00* (2006.01)
*G02F 1/29* (2006.01)
*H04J 14/02* (2006.01)
*H04Q 11/00* (2006.01)

(52) U.S. Cl.
CPC ........... *G02B 26/0816* (2013.01); *G02F 1/29* (2013.01); *H04J 14/0212* (2013.01); *H04Q 2011/003* (2013.01)

(56) References Cited

U.S. PATENT DOCUMENTS

2004/0252938 A1* 12/2004 Ducellier ........... G02B 6/12011
                                                                 385/27
2009/0154876 A1   6/2009 McLaughlin et al.
2011/0217037 A1*  9/2011 Yoshida .................. H04J 14/02
                                                                 398/48

FOREIGN PATENT DOCUMENTS

| CN | 202383357      |   | 8/2012  |
|----|----------------|---|---------|
| JP | 6-331850 A     | * | 12/1994 |
| JP | 2013061481 A   |   | 10/2011 |
| WO | 2009001847 A1  |   | 12/2008 |

* cited by examiner

METHOD FOR COMPENSATING FOR WAVELENGTH SHIFT IN WAVELENGTH SELECTIVE SWITCH, AND DEVICE THEREFOR

CROSS-REFERENCE TO RELATED APPLICATION

The present application is a national phase entry under 35 U.S.C.§371 of International Application No. PCT/CN2012/080943 filed Sep. 4, 2012 published on Jun. 27, 2013 as WO/2013/091401, which claims priority from Application No. 201110428394.7 filed in the Chinese Patent Office on Dec. 20, 2011, all of which are incorporated herein by reference.

BACKGROUND

According to the invention hereof, there is provided a compensation method and its apparatus for wavelength shift in Wavelength Selective Switch (hereinafter referred to as WSS). This invention is categorized into the photo-communication.

The development of wavelength division system and higher demand on its flexibility have facilitated the popularization of WSS, which can enable adding or dropping the wavelength arbitrarily at a random port and render a necessary technological platform for the flexible networking of optical networks.

WSS is often disseminated at different nodes of optical networks, thereby being required for reliable working at a large temperature range. Glass elements are often chosen for optical elements in WSS, which will be subjected to thermal expansion effect, leading to the change in their optical property. Besides, the glue through which the aforementioned optical elements and optical baseplate are connected is also under the thermal expansion effect, which might lead to the migration of optical elements. All this will cause the deviation of wavelength from the original direction, affecting ITU-T wavelength alignment in WSS, which will result in wavelength shift.

Capella Company put forward a compensation method for WSS wavelength shift through MEMS micromirror or LC array in its American patent application US2009/0028503A1 (publication date of Jan. 29, 2009). The patent claims to dispose the light path deflection element MEMS micromirror or LC array behind the collimator array to deflect light path. However, this method requires inserting the light path deflection element into the original light path, in which case the possible MEMS encapsulation is complex whilst LC array installation increasing difficulty in temperature controlling, polarization element disposing at the light path, the consequent light path optical alignment, and size expanding for whole apparatus.

JDSU Company came up with a compensation method for WSS wavelength shift through mechanical structure design and assembly method in its American patent application U.S. Pat. No. 8,036,502B2 (publication date of Dec. 22, 2009). The patent claims to adopt special design of optical baseplate and matching buffers, fixed buffer ensuring alignment position invariance between light line and MEMS chip, while moving buffer decreasing thermal stress caused by mismatching expansion coefficient between optical baseplate and optical shell and compensating for related wavelength shift. However, this method is not suitable for active compensation for wavelength shift and asks for a high standard for module encapsulation consistency.

SUMMARY

The object of this invention is to overcome the existing technological deficiency, solve the wavelength shift problem of WSS, and put forward a compensation method for WSS wavelength shift by leveraging compensation apparatus herein described.

This invention adopts the following principle: in the WSS light path structure, a compensation apparatus can be used to change the angle of incidence of incident beam at beam split element, after which the diffraction angle of every wavelength will also be altered. Hereupon, every wavelength will, through focusing lens, has a translation along the direction of the switch and attenuation unit on the switch and attenuation array so that every incident wavelength on the switch and attenuation array will have a migration relative to ITU-T wavelength. Or the incidence angle might be kept unchanged, in which case a compensation apparatus will be added to the back of the folding reflector on the light path after beam split by diffraction grating so as to have a whole regulation over the light path deflecting direction of every wavelength, change the center position of every wavelength on the switch and attenuation array, and cause a migration relative to ITU-T wavelength. While the center position of every wavelength is adjusted, an angle is introduced into the direction of switch and attenuation unit. However, due to the wavelength sensitivity of the WSS light path, the angle is small. Moreover, the orientation of switch and attenuation is a small light spot which is not sensitive to angle. Therefore, introducing an angle together with adding a compensation apparatus to the back of light path folding reflector will not cause any change of intersection loss of WSS light path. The more the angle of WSS light path introduced by compensation apparatus varies, the more translation every wavelength along the orientation of the switch and attenuation array will have, the higher the wavelength compensation will gain.

The invention hereof adopts the following technological solutions: A compensation method for wavelength shift of WSS comprises the following steps: Step 1. Measure the direction and amount of wavelength shift of WSS; Step 2. Adopt a composite structure of rotating beam (304) and compensation blocks (302) with different thermal strokes; Step 3. Glue the composite structure to the side of collimating array of WSS or the back of the reflecting surface of the reflector of WSS; neutralize the wavelength shift direction with the rotating direction of the composite structure, and keep equal the wavelength compensation dosage of the composite structure and the practical wavelength shift amount of WSS.

The stated different thermal strokes of the composite structure in Step 2 is realized by setting the size of the compensation blocks with a width and the different thermal expansion coefficients of compensation blocks and rotating beam at the same external temperature.

The stated different thermal strokes of the composite structure in Step 2 is realized by electrical heating of compensation blocks and rotating beam with the same expansion coefficient to reach different temperatures.

A compensation apparatus for WSS wavelength shift comprises a fixing seat, a rotating beam and compensation blocks. The compensation blocks and the rotating beam are connected to the fixing seat. And the compensation blocks have larger thermal expansion stroke than the rotating beam.

The stated compensation blocks have the same height as the rotating beam; a rotating arm is connected and fixed on the compensation blocks and the rotating beam.

The stated fixing seat is in the shape of L; compensation blocks are on the inner side of the fixing seat.

The stated compensation blocks are at one side of the rotating beam; and the compensation blocks have a larger thermal expansion coefficient than the rotating beam.

The sated rotating beam and the fixing seat are a composite structure which is shaped through integral machining.

The compensation block of stated rotating beam and the compensation blocks are fixed to the fixing seat parallelly and symmetrically, both of which are disposed with electronic controlling heating apparatus.

The stated rotating arm is mounted with a boss, which contacts with the rotating beam and compensation blocks.

The stated rotating beam and compensation blocks are metal blocks, the electronic controlling apparatus on which is a heating resistor.

The stated rotating beam and compensation blocks are piezoelectric ceramics.

This invention has the following advantages:
1. The compensation apparatus of this invention is applicable to various WSS light paths without changing the light path structure of WSS;
2. The compensation apparatus of this invention is simple in structure and convenient in encapsulation without complicating the processing.

Thereinto:
201: collimator array; 202: focusing lens; 203: collimating lens; 204: diffraction grating; 205: focusing lens; 210: switch and attenuation array; 208A: a $1^{st}$ reflector; 208B: a $2^{nd}$ reflector; 301: fixing seat; 302: compensation blocks; 303: rotating arm; 304: rotating beam; 305A: a $1^{st}$ electronic controlling apparatus; 305B: a $2^{nd}$ electronic controlling apparatus; 300: compensation apparatus; 100: optical baseplate; 200: WSS optical element; g: space between compensation blocks 302 and rotating beam 304; H: height of compensation blocks 302; b: width of compensation blocks 302; a: width of rotating beam 304;

DETAILED DESCRIPTION

Hereinafter, a specified embodiment to which the present invention is applied is described in detail with reference to the drawings.

Figure 1:
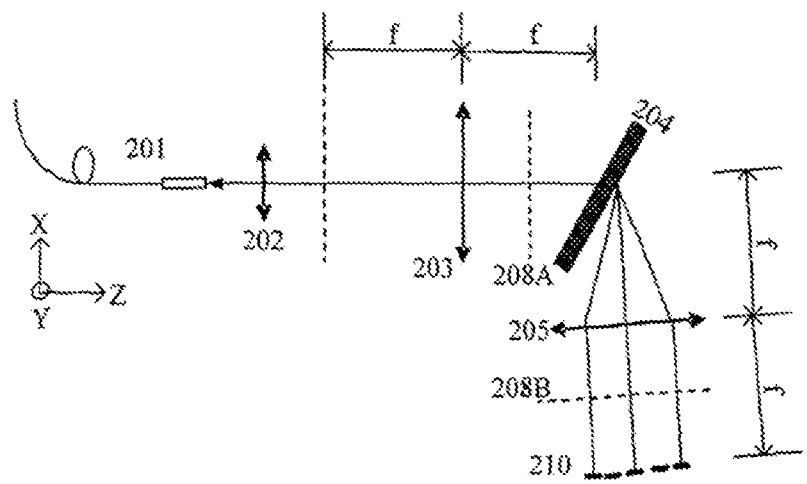
FIG 1. Structure Chart of the WSS Light Path in the Invention.

The light path structure of WSS applicable to the invention at the wavelength spectral plane is as the details in FIG. 1 that collimator array 201, focusing lens 202, collimating lens 203, diffraction grating 204, focusing lens 205 and switch and attenuation array 210 are set in sequence. The light path is as follows: after alignment by the collimator array, the input optical signal is expanded by the beam expander composed of a focusing lens 202 and a collimator lens 203. The collimated light beam through diffraction grating 204 falls into single channel optical signals in sequence, which will be focalized by a focusing lens 205 on a switch and attenuation array 210. In addition, to decrease the size of WSS module, a first reflector 208A could be added to the space between collimator lens 203 and diffraction grating 204, or a second reflector 208B could be added to the space between collimator lens 205 and attenuation reflection array 210 to fold the light path, or both a $1^{st}$ reflector 208A and a $2^{nd}$ reflector 208B could be added at the same time to fold the light path. The compensation apparatus could be connected to the collimator array 201, or the back of the reflecting surface of the $1^{st}$ reflector or the $2^{nd}$ reflector.

Figure 2:
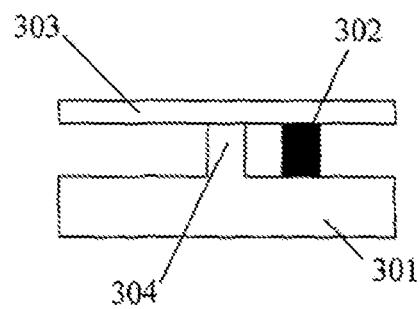
FIG. 2. Structure Chart of the Passive compensation apparatus in the Invention.

The compensation apparatus pursuant to the invention hereof has two structures. One is passive compensation apparatus, and the other is active compensation apparatus. As in FIG. 2, the passive compensation apparatus comprises a fixing seat 301, compensation blocks 302, a rotating arm 303, and a rotating beam 304. The rotating beam 304 and fixing seat 301 are connected and fixed as a whole. fixing seat 301 and rotating beam 304 could also be shaped through integral processing. In this case, rotating beam 304 is a boss set on the fixing seat 301. Compensation blocks 302 and rotating beam 304 are fixed to the fixing seat 301, compensation blocks 302 are on one side of the rotating beam 304, and compensation blocks 302 and rotating beam 304 should be at the same height. When compensation blocks 302 are installed at the right side of the rotating beam 304, the compensation blocks 302 will drive the rotating arm 303 to move anticlockwise in conditions of high temperature and move clockwise in conditions of low temperature. When compensation blocks 302 are installed at the left side of the rotating beam 304, compensation blocks 302 will drive the rotating arm 303 to move clockwise in conditions of high temperature and move anticlockwise in conditions of low temperature. fixing seat 301 and rotating beam 304 could be glass, and compensation blocks 302 should use metal. To get enough wavelength compensation dosage, compensation blocks 302 should choose metal with big thermal expansion coefficient, such as aluminum. Due to difference in thermal expansion coefficients of such two materials as glass and metal, when environment temperature changes, the rotating beam 304 and compensation blocks 302 have different strokes. The rotating arm 303 of the compensation apparatus could be connected in parallel to a side face of WSS collimator array 201, or to the back of the $1^{st}$ reflector 208A, or the back of the $2^{nd}$ reflector 208B. The rotating arm 303 of the compensation apparatus could be connected to one of the three elements in WSS module so as to realize common rotating with the connecting element, and reach the goal of wavelength compensation.

Figure 3:
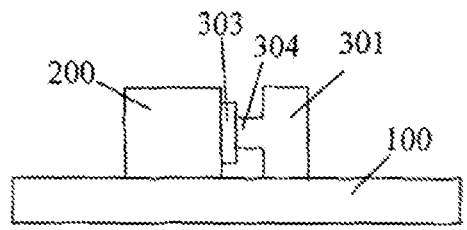
FIG. 3. Connecting Chart of WSS Optical Element, Optical Baseplate and compensation apparatus.

FIG. 3 is the side view of connection between the optical baseplate 100 with compensation apparatus and WSS optical element 200. On this occasion, WSS optical element 200 is collimator array 201 or $1^{st}$ reflector 208A or $2^{nd}$ reflector 208B. Compensation blocks 302, rotating beam 304 and fixing seat 301 are glued together, fixing seat 301 and optical baseplate 100 are glued together, and rotating arm 303 is glued to WSS optical element 200. In the compensation apparatus of this structure, rotating arm 303 is connected with WSS optical element so that the connecting surface between the compensation apparatus and WSS optical element is flat and fixed area increases, which creates a better result of wavelength shift compensation. The invention may not use a rotating arm 303. both compensation blocks 302 and rotating beam 304 could be glued to the WSS optical element. The compensation apparatus of this structure could also drive the connected elements to rotate to reach the technological goal of wavelength shift compensation.

Figure 4:
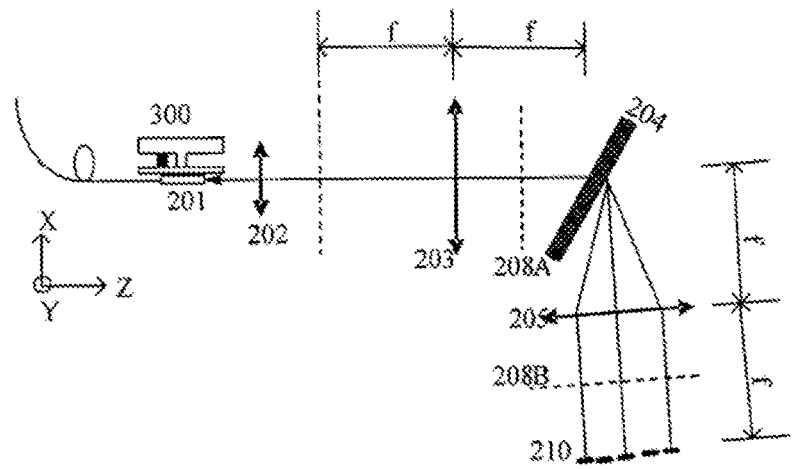
FIG. 4. Light Path Graph of Wavelength Shift Compensation by installing the compensation apparatus on Collimator Array in the Invention.

When adopting the compensation apparatus in the invention to have wavelength shift compensation, the direction and shift amount of the WSS wavelength shift before disposing compensation blocks 302 can be measured. With compensation apparatus 300 on the collimator array 201 as in FIG. 4, if WSS wavelength is measured to drift toward long wave direction at high temperature and toward short wave direction at low temperature, to compensate the stated wavelength shift, compensation blocks 302 at the right side of rotating beam 304 is to be installed so that at high temperature compensation apparatus 300 will make the angle of collimator array 201 to bend down to resist the WSS shift toward long wave at high temperature. If the practical WSS module wavelength shift are measured at a negative direction, compensation blocks 302 must be disposed at the left side of rotating beam 304, after which adjustment must be made on the space between compensation blocks 302 and rotating beam 304 according to wavelength shift amount necessary to be compensated. Finally the compensation blocks 302, fixing seat 301 and rotating arm 303 are to be glued together. Besides, the glue could be UV-curved glue. Relatively soft UV-curved glue should be adopted to glue rotating arm 303 and fixing seat 301 together.

Figure 5:
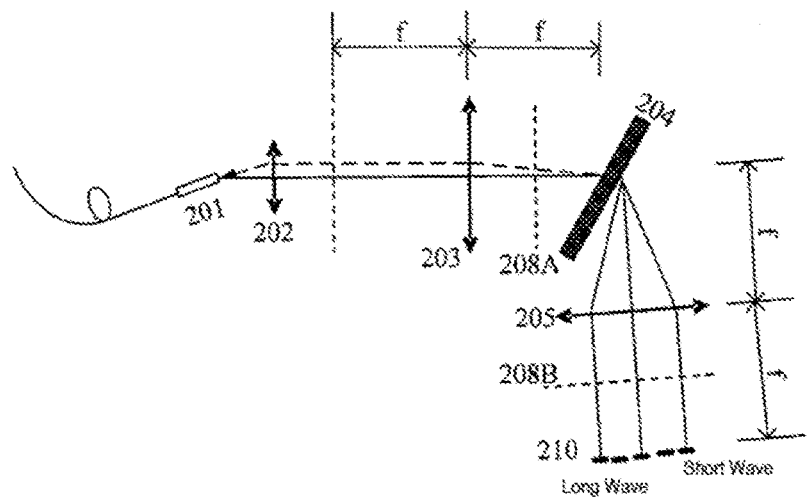
FIG. 5. Schematic Diagram of the Relation between the deflection angle of Collimator Array and Wavelength Shift.

Via compensation apparatus 300, the deflecting direction of collimator array or reflector decides the wavelength deflecting direction. Its process of wavelength shift compensation is as follows: As in FIG. 4, with compensation apparatus 300 glued to one side surface of collimator array 201, then temperature varies, compensation apparatus 300 will drive collimator array 201 to rotate horizontally so that light path angle through collimator array 201 is changed. That the deflected light path passes through beam expansion system including focusing lens 202 and collimating lens 203, together with the change of incidence angle of light path into diffraction grating will realize compensation for wavelength shift. As in FIG. 5, when angle of collimator array 201 moves upward, the incidence angle at diffraction grating will decrease, and diffraction angle will increase, which means wavelength will drift toward the left of switch and attenuation array 210, or say, the long wave direction. On the contrary, if the angle of collimator array 201 bents down, wavelength will drift toward the short wave direction. Therefore, by adopting compensation apparatus 300 to make WSS optical element drift upward or downward, it could make wavelength drift to long wave or short wave direction so as to compensate the WSS wavelength shift to different directions.

By installing the compensation apparatus at the place or $1^{st}$ reflector 208A or $2^{nd}$ reflector 208B, the compensation apparatus will drive reflector to rotate horizontally making every wavelength light path change so as to realize the wavelength shift compensation. Collimator array 201 and reflector 208 adopt identically equipped compensation apparatus, yet they have different optical effects. Because the focusing lens 202 and collimator lens 203 of beam expansion system reduces the light path angle deflection through collimator array 201, the compensation result of compensation apparatus at reflector 208 for wavelength shift compensation is more obvious. And wavelength compensation dosage at reflector 208 is times of that at collimator array 201. Compensation times equal the expansion ratio of the WSS expansion system.

Figure 6A:
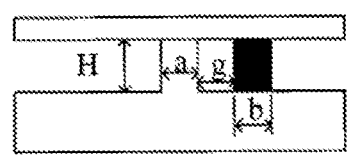
FIGS. 6a-6c. Schematic Diagram of the Working Condition of the Passive compensation apparatus.
Figure 6B:
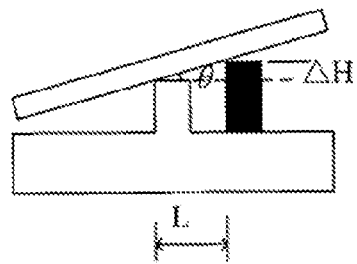
Figure 6C:
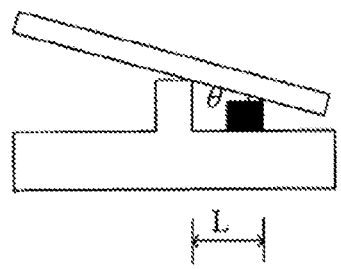

Passive compensation apparatus works As in FIGS. 6a to 6c, among which 6a is the compensation apparatus in the room temperature condition, 6b the high temperature and 6c the low temperature. At room temperature, compensation blocks 302 keep the same height; at high temperature, rotating beam 304 and compensation blocks 302 will expand in height due to thermal expansion. Thermal expansion coefficient of metal is an order of magnitudes larger than that of glass. So compensation blocks 302 will have a larger elongation than rotating beam 304. If the height of compensation blocks 302 at room temperature is H, thermal expansion coefficient difference between glass and metal is $\Delta\alpha$, environment temperature difference between high and low temperatures is $\Delta T$, then $\Delta H = H \times \Delta\alpha \times \Delta T$. $\Delta H$ is the height difference between compensation blocks 302 and rotating beam 304 due to temperature effect. If the arm of force in various conditions is L, and the rotation angle of rotating arm 303 is $\theta$, then $$\tan(\theta) = \frac{\Delta H}{L} = \frac{H \cdot \Delta\alpha \cdot \Delta T}{L}.$$

If the width of parallel direction of rotating beam 304 along fixing seat 301 is a, the width of parallel direction of blocks 302 along fixing seat 301 is b, the space between rotating beam 304 and compensation blocks 302 is g, then rotating arm of force at high temperature is L=a+g, and rotating arm of force at low temperature is L=g+b. As implied by the above formulas, to increase wavelength compensation dosage, $\theta$ value is to be increased through adding the compensation block height and reducing the rotating arm of force L of compensation apparatus.

Figure 11:
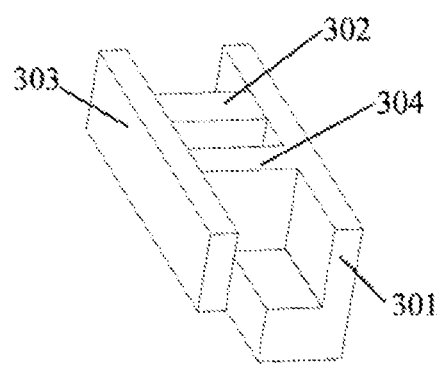
FIG. 11. Improved Passive compensation apparatus for Increasing Wavelength Compensation Dosage via Increasing the Height of Compensation Blocks.

When increasing the height of compensation blocks to increase wavelength compensation dosage, heights of rotating beam 304 and compensation blocks 302 increase which increases the WSS volume. To maintain the size of compensation apparatus in light path, it is to decrease the thickness of fixing seat 301 to keep the whole size of WSS unchanged. When the thickness of fixing seat 301 decreases, to ensure the bonding strength between fixing seat 301 and WSS baseplate 100 the fixing seat 301 could be designed in the form of L so as to keep unchanged the contacting area between the fixing seat 301 and the WSS baseplate 100. As in FIG. 11, compensation blocks are installed inside the L fixing seat 301. Compensation blocks 302, vertical to the optical baseplate, are glued to fixing seat 301. This technological method could keep unchanged the contacting area between the fixing seat 301 and optical baseplate in the situation of increasing the height of compensation blocks, and decreasing the thickness of fixing seat 301 so as to increase wavelength compensation dosage.

According to focal length of every lens, space between lenses and the position of WSS optical element as compensation apparatus in light path, it is known that the relations amongst the collimator array 201, the angle of reflector 208 as well as the wavelength shift, so as to identify the relation between the angle of compensation apparatus and wavelength shift. Usually it is started by identifying the space g between compensation blocks 302 and rotating beam 304 according to the measured WSS wavelength shift amount at high temperature. However, from room temperature to high and low temperatures, WSS wavelength shift amounts are different at the same range or temperature. To have complete compensation, compensation apparatus at the stated temperature variations should have different wavelength compensation dosages. According to the stated compensation apparatus's angle formula, to have different compensation dosages from room temperature to high and low temperatures, the ratio $$\frac{H \cdot \Delta \alpha}{L}$$

of the rotation angle θ of rotating arm 303 to temperature range ΔT should be different. When the whole compensation size and component materials are decided, H and Δα are determined value. In this case, width b of compensation blocks 302 is to be changed so that the arm of force L will be different at high and low temperatures. Then the high temperature and low temperature variations have different proportionality coefficients $$\frac{H \cdot \Delta \alpha}{L}.$$

The value of $$\frac{H \cdot \Delta \alpha}{L}$$

at high or low temperature is decided by the wavelength compensation dosage goal. Appropriate width b of compensation blocks 302 will be defined to keep the wavelength compensation dosage of compensation apparatus the same as the measured WSS wavelength shift amount so as to realize complete compensation for wavelength shift.

When using the first passive compensation apparatus to realize wavelength shift compensation, you may only use the stated compensation apparatus to finish WSS wavelength shift compensation rather than additionally install control circuit to control over compensation apparatus. Every component part of the compensation apparatus is simple in structure and easy to get. But the passive compensation apparatus is not easy to have continuous and adjustable compensation for WSS module wavelength shift. Therefore passive compensation apparatus is applicable to situation which does not require much wavelength shift compensation accuracy. If the bandwidth margin of WSS optical module is adequate, passive compensation apparatus might be adopted to compensate for the WSS module wavelength shift.

Figure 7:
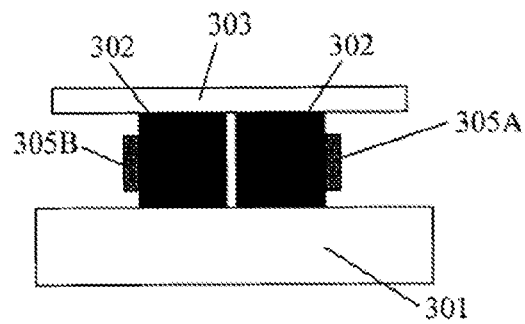
FIG. 7. Structure Chart of the Active compensation apparatus in the Invention.
Figure 8:
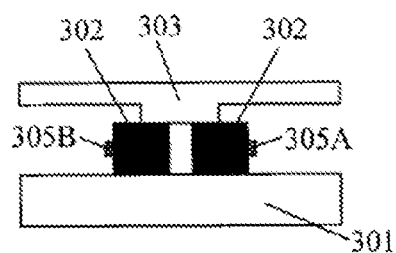
FIG. 8. Structure Chart of the Improved Active compensation apparatus for Decreasing Arm of Force.
Figure 9:
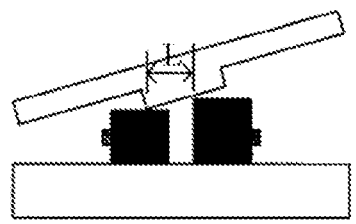
FIG. 9. Schematic Diagram of the Working Arm of Force of the Improved Active compensation apparatus in FIG. 8.

To realize a continuous and adjustable compensation for WSS wavelength shift and advance wavelength compensation accuracy, the invention hereof puts forward a second structure, an active compensation apparatus, which has the same structure principle as passive compensation apparatus. They both adopt a composite structure including rotating beam and compensation blocks, which have different strokes that enables compensation apparatus to rotate and lead WSS optical element to rotate. They only differ in that rotating beam in active compensation apparatus also adopts a compensation block, implying that there are 2 compensation blocks in the apparatus. When compensation apparatus starts to work, the compensation block which is not via electric control among the two compensation blocks serves as rotating beam. Utilization of this compensation apparatus can have active compensation for wavelength shift. As in FIG. 7, an active compensation apparatus comprises a fixing seat 301, a rotating arm 303, compensation blocks 302, a $1^{st}$ electric control device 305A, and a $2^{nd}$ electric control device 305B. Two compensation blocks 302 are mounted on the fixing seat 301 symmetrically. Two compensation blocks 302 are glued and fixes to the fixing seat 301. Two compensation blocks are respectively installed with a $1^{st}$ electric control device 305A and a $2^{nd}$ electric control device 305B. Rotating arm 303 is installed above the compensation blocks 302. The contacting part between rotating arm 303 and compensation blocks 302 could be designed into a prominent boss As in FIG. 8. The main function of boss is to decrease the arm of force L and increase wavelength compensation. As in FIG. 9, the working arm of force L is no longer related to the width of compensation blocks 302 but related to the width of the boss installed at the rotating arm 303. In this situation, the working arm of force L decreases so as to increase the wavelength compensation dosage of the compensation apparatus. Compensation blocks could use metal such as aluminum. Compensation blocks 302 could also be piezoelectric ceramics or other elements with micrometric displacement kinetic energy. When two compensation blocks 302 are metal blocks, the $1^{st}$ electric control device 305A and the $2^{nd}$ electric control device 305B are heating resistor. If you want the compensation apparatus to realize the rotating effect as the FIG. 6b to make wavelength shift compensation, you could power up the heating resistor on the compensation block 302 on the right side so as to make the right compensation block 302 heat up and expand. On this occasion, the left compensation block 302 serves as rotating beam, and vice versa. When compensation blocks 302 are piezoelectric ceramics, you could power up one of the piezoelectric ceramics according to the WSS wavelength shift direction so as to make the stated piezoelectric ceramic have certain micrometric displacement. In this situation, the piezoelectric ceramic that is not powered up serves as the rotating beam and drive WSS optical element to rotate so as to reach the same rotating effect with that adopting aluminum blocks.

The active compensation apparatus of the invention, just like the passive compensation apparatus, could not have a rotating arm 303. Two compensation blocks 302 being glued and fixed to WSS optical element, compensation apparatus with such structure also can drive the connecting element to rotate so as to realize the technical goal of wavelength shift compensation.

Figure 10:
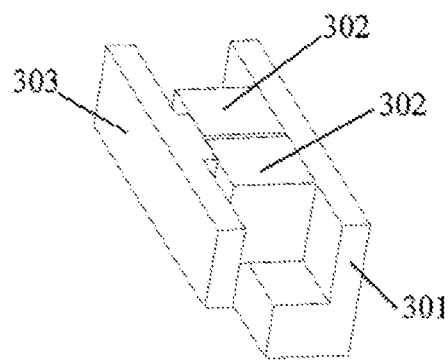
FIG. 10. Improved Active compensation apparatus for Increasing Wavelength Compensation Dosage via Increasing the Height of Compensation Blocks.

In active compensation apparatus, in order to increase compensation dosage and ensure the bonding strength between fixing seat 301 and WSS optical baseplate 100, the fixing seat 301 could be designed in the shape of L so as to keep unchanged the contacting area between the fixing seat 301 and WSS optical baseplate. As in FIG. 10, two compensation blocks 302 are installed inside the L fixing seat 301. Compensation blocks 302 vertical to one side of the optical baseplate are glued and fixed to the fixing seat 301. This technological pan could keep unchanged the contacting surface between fixing seat 301 and optical baseplate while increasing the height of compensation blocks, decrease the thickness of fixing seat 301 and increasing the wavelength compensation dosage.

Although a specified embodiment to which the present invention is applied is described in detail for reference, it is to be noted that, for technologists in this filed, this invention can be arbitrarily modified in both form and details without departing from the spirit and scope thereof, and the modification(s) will fall within the scope of protection of the invention stated herein.

The invention claimed is:

1. A compensation method for wavelength shift of a wavelength selective switch (WSS) comprising the following steps:
   measuring the direction and amount of the wavelength shift of WSS;
   adopting a composite structure of a rotating beam and compensation blocks having different thermal strokes;
   gluing the composite structure to a side of a collimating lens of WSS or a back of a reflecting surface of a reflector of WSS; neutralizing the wavelength shift direction with a rotating direction of the composite structure, and equalizing a wavelength compensation dosage of the composite structure with the measured amount of the wavelength shift of WSS;
   a fixing seat, wherein the compensation blocks and the rotating beam are adhered to the fixing seat; and
   the compensation blocks have a larger thermal expansion stroke than a thermal expansion stroke of the rotating beam.

2. The compensation method for wavelength shift of WSS in claim 1 comprising:
   the different thermal strokes of the composite structure in the adopting step is realized by electrical heating of compensation blocks and rotating beam with the same expansion coefficient creating different temperatures.

3. The wavelength shift compensation apparatus for wavelength shift of WSS as in claim 1, comprising:
   the compensation blocks have the same height as the rotating beam; a rotating arm adhered and fixed on the compensation blocks and the rotating beam.

4. The wavelength shift compensation apparatus of WSS as in claim 1 comprising:
   the fixing seat having the shape of L; the compensation blocks provided on the inner side of L shape of the fixing seat.

5. The wavelength shift compensation apparatus of WSS as in claim 1 comprising:
   the compensation blocks provided at one side of the rotating beam.

6. The wavelength shift compensation apparatus of WSS as in claim 5 comprising:
   the rotating beam and the fixing seat comprise a composite structure built through integrated machining molding.

7. The wavelength shift compensation apparatus of WSS as in claim 3 comprising:
   the compensation blocks are fixed to the fixing seat parallel and symmetrically, both of which are installed with an electronic controlling heating apparatus.

8. The wavelength shift compensation apparatus of WSS as in claim 7 comprising:
   the rotating arm mounted with a boss which contacts with the rotating beam and compensation blocks.

9. The wavelength shift compensation apparatus of WSS as in claim 7 comprising:
   the rotating beam and compensation blocks comprise metal blocks, and the electronic controlling apparatus comprising a heating resistor.

10. The wavelength shift compensation apparatus of WSS as in claim 7 comprising:
    the rotating beam and compensation blocks are piezoelectric ceramics.

11. A compensation method for wavelength shift of a wavelength selective switch (WSS) comprising the following steps:
    measuring the direction and amount of a wavelength shift of WSS;
    adopting a composite structure of a rotating beam and compensation blocks having different thermal strokes;
    gluing the composite structure to a side of a collimating lens of WSS or a back of a reflecting surface of a reflector of WSS; neutralizing a wavelength shift direction with a rotating direction of the composite structure, and equalizing a wavelength compensation dosage of the composite structure with a measured amount of the wavelength shift of WSS;
    wherein the different thermal strokes of the composite structure in the adopting step comprises setting at least a width specification of the compensation blocks, including different thermal expansion coefficients of the compensation blocks and the rotating beam under the same external temperature.

* * * * *